Oct. 4, 1932.  G. M. KESSLER  1,881,279
LICENSE PLATE HOLDER FOR AUTOMOBILES
Filed July 5, 1932
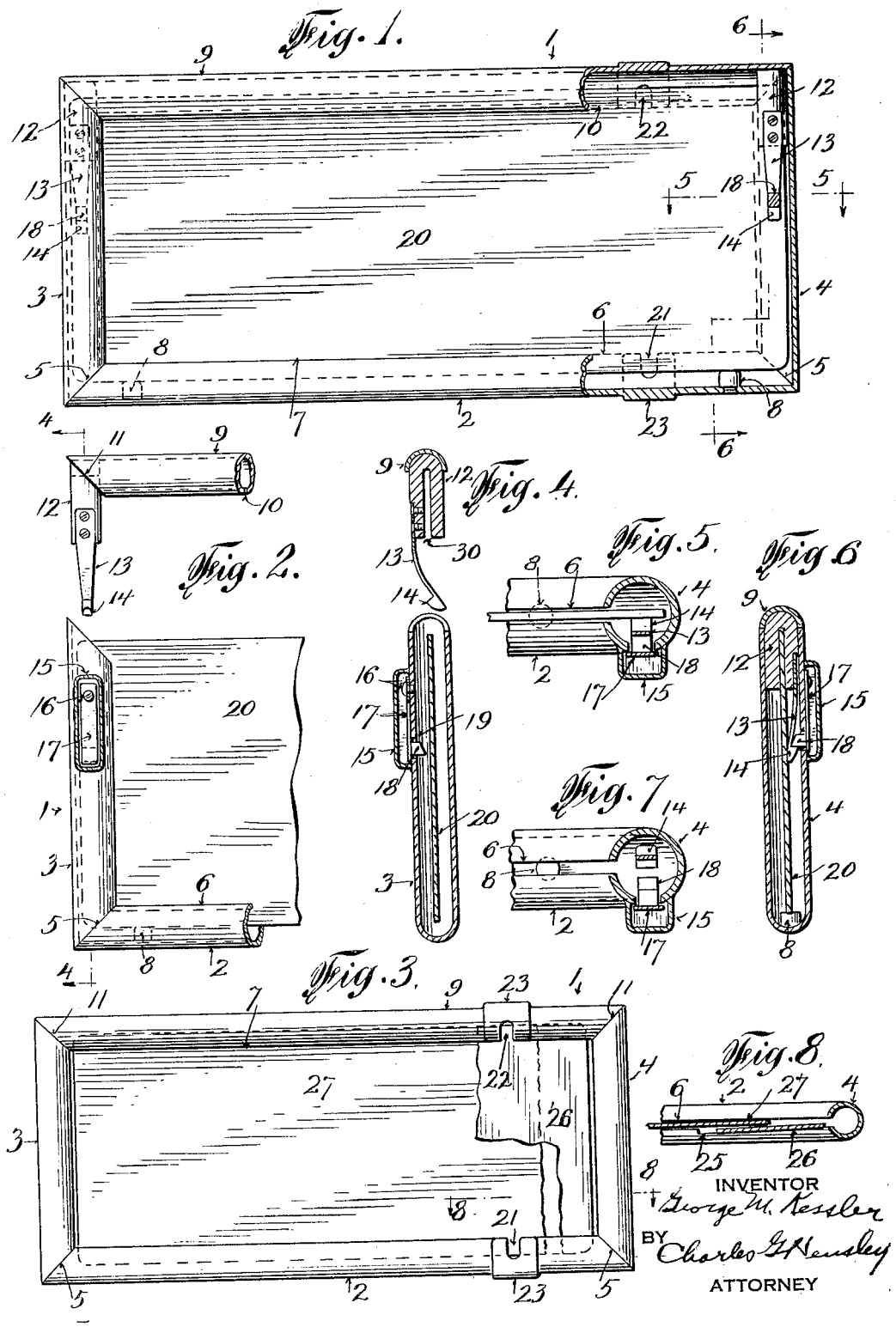

Patented Oct. 4, 1932

1,881,279

UNITED STATES PATENT OFFICE

GEORGE M. KESSLER, OF JERSEY CITY, NEW JERSEY

LICENSE PLATE HOLDER FOR AUTOMOBILES

Application filed July 5, 1932. Serial No. 620,802.

My present invention relates to a frame or holder adapted to be applied to the front or rear, or both front and rear of automobiles, for the purpose of holding a license plate in position for identification. The object of the invention is to provide a holder from which the license plate cannot be detached without destroying the plate. At present it is the practice to attach the license plates of automobiles by simply bolting them in a frame or holder from which the plates may be readily detached or removed by unauthorized persons, and new and fictitious plates substituted in their place. It is common practice for thieves stealing automobiles to have a fictitious or substitute set of plates, and after stealing the automobile and driving it a short distance from the place where it was stolen, to detach the owner's or operator's lawful plates belonging to the particular automobile, and to substitute fictitious plates in their place. If the owner or operator of the automobile discovers the loss of the vehicle and gives an alarm, he or she will naturally give the number of the authorized license plates which were on the automobile, and by the time a police alarm has been broadcast the thief or thieves will have completed the substitution of the fictitious plates, so that police officers on the lookout for the stolen vehicle will be misled by the fictitious plates having different numbers than the correct or authorized plates which were removed.

In order to avoid this, I provide a simple and inexpensive frame into which the license plate may be readily inserted, together with a removable frame member which is temporarily removed while the plate is being inserted; and when this removable member of the frame is inserted in its proper place, it, together with the remainder of the frame, surrounds the edges of the license plate. The frame, once the license plate is placed in its proper position, is so locked that the license plate cannot be removed from the frame without severing the plate either by chiseling it or by sawing through it, in order to permit the severed portions to be slid one over the other and thereby release the locking devices which lock the detachable member to the main portion of the frame. Thus the license plate is deformed or divided into parts in order to remove it from the frame. This operation is one which cannot be readily carried out by a thief who steals the automobile, or at least it cannot be done quickly enough to permit a rapid exchange for fictitious or unauthorized plates. On the other hand, if thieves do resort to the cutting of the plate, at least the plates so mutilated cannot be again used in another operation as they will readily disclose the fact that they have been mutilated.

I am aware that attempts have been made to provide locking frames for license plates, but the object of the present invention is to make a practical, inexpensive and simple devices for the purpose and to provide a simple way of mutilating or cutting the plate in order to make it removable from the holder. Other advantages will be set forth in the following detailed description of my invention.

In the drawing forming part of this application,

Figure 1 is a front elevation of a license plate and its frame in operative condition, some parts being broken away to show the interior.

Figure 2 is a front elevation of one end of the frame and license plate showing the removable member of the frame about to be inserted in position; and in which view, a portion of the frame is broken away to show one of the locking pawls, Figure 3 is a front elevation of the frame, illustrating the license plate after it has been severed and with the parts moved in to permit the locking devices to be released, Figure 4 is a sectional view taken on the line 4—4 of Figure 2, Figure 5 is a sectional view taken on the line 5—5 of Figure 1, Figure 6 is a sectional view taken on the line 6—6 of Figure 1, Figure 7 is a sectional view similar to Figure 5 but with the license plate removed, and Figure 8 is a sectional view taken on the line 8—8 of Figure 3.

In the drawing I have shown a frame 1 of rectangular shape and the stationary portion of the frame may be irremovably attached to or made a part of any type of bracket which is mounted on the frame or chassis of an automobile so as not to be readily removable. This frame is shown as consisting of a lower horizontal tube 2 at the ends of which are upwardly extending tubes 3, 4 which are connected preferably by mitred joints 5 with the lower tube 2 either by welding or in any other desirable manner, so that the lower horizontal tube and the upwardly extending tubes at the opposite ends of the frame form a solid U shaped structure. These tubular members are each provided with a slot 6 on their inner sides or facing the opening 7 within the frame. The slots 6 of each of these tubular members align with each other or, in other words, all of the slots of the tubular members are in the same common vertical plane.

Within the lower tubular member 2 I have shown resting pieces or buttons 8 on which the bottom edge of the license plate may rest, and these may be made of compressible material in order to avoid noise and rattling of the license plate.

The upper or closing member of the frame consists of a horizontally extending tubular member 9 which corresponds with the lower tubular member 2 except that it is detachable from the remainder of the frame. It also is hollow and has a longitudinal groove 10 on its inner side which, when the removable tube is in operative position, lies in the same vertical plane with the slots 6 of the several tubes 2, 3, 4. From the above it will be apparent that the frame consists of several members preferably in the form of a rectangle, the several members being hollow to receive various edges of the license plate; and each having a longitudinal groove through which the corresponding edge of the license plate extends, so that the several edges of the license plate are all enclosed within the tubular members of the frame.

The removable tubular member 9 is preferably chamfered at the opposite ends as at 11 to form a close mitred joint with the upright tubular members 3, 4. At each end the tube 9 is provided with a short post 12 extending at right angles to the tube and rigidly held thereto by brazing, welding or in any other manner. On the lower end of each of these projections I have provided a spring arm 13 each of which is provided with a hook or pawl 14 on the free end and the posts 12 with their spring arms 13 are adapted to be inserted into the bores of the two end tubular members 3, 4 of the frame, so that the spring arms are enclosed in the vertical tubes when the frame is assembled.

On the back surfaces of the two vertical tubes 3, 4 I provide a projecting housing 15 which is integral with or is firmly secured by welding or otherwise to these tubes. Within these housings are mounted by means of the rivets 16 spring arms 17 each having a locking pawl 18 on its free end which pass through apertures 19 in the tubular member 9 so as to lie normally in the path of the hook or pawl 14 on the respective spring arms 13. I have shown at 20 in Figures 1, 2, 4, 5 and 6 a license plate which is usually made of sheet metal and which usually bears a number designating the ownership of the automobile to which the device is attached; or in other words, it is one of the license plates usually issued by authority of the particular state of which the owner is a resident. As originally furnished to the owner of the vehicle, this plate is generally of sheet metal of rectangular shape, and is made of one piece.

In assembling the license plate in the frame, the upper tubular member 9 is detachable from the remainder of the frame and the license plate 20 is inserted from the top by allowing it to slide with its end edges extending through the slots 6 of the vertical tubes 3, 4, the license plate sliding downwardly until the bottom edge enters the slot 6 of the bottom tube 2 and until the lower edge of the plate rests on the abutments 8. The removable tube 9 is then applied in the manner shown in Figures 2 and 4 to the stationary frame by presenting it over the stationary frame, as shown in Figure 2, and moving it downwardly so that the hooks 14 on the lower ends of the spring arms 13 enter between the edge of the license plate and the rear sides of the vertical tubular members 3, 4. As the tube 9 is moved downwardly, the spring arms 13 slide between the edges of the license plate and the rear wall of the vertical tubes 3, 4 until the mitred ends of the tube 9 rest against the mitred ends of the vertical tubes 3, 4, thus closing the frame or completing the rectangle.

When the upper tube is brought into its final position, the hooks or pawls 14 on the spring arms 13 will have passed below the hooks 18 on the spring arms 17, the latter arms being forced back until the hooks 14 pass below the hooks 18, whereupon the spring arms 13 are held as shown in Figure 6 by the license plate in such position in relation to the hooks 18 so that the top frame member or tube 9 is locked to the stationary portion of the frame. When in this position the upper tube cannot be raised because the hooks 14 are locked by the hooks 18 as long as the license plate engages the arms 13.

It is apparent that once the tube member 9 is lowered into position and locked by engagement of the hooks 14, 18, the several portions of the frame are so locked that they cannot be detached for the removal of the license plate. It will be apparent also that to remove the top frame member it is necessary to sever the license plate in order to remove it from the frame.

I have shown notches 21 extending inwardly in the lower tube member 2 to expose a small portion of the lower edge of the license plate which extends into this tubular member, the notches being formed preferably in the tubular member on opposite sides of the slot 6. In like manner I provide similar slots 22 in the removable tube member 9 to expose a small portion of the top edge of the license plate which extends into this tubular member, as shown in Figure 1; and the slots 22 are preferably arranged in vertical alignment with the slots 21 although this particular arrangement is not imperative. I have shown these several notches adjacent one end of the license plate although it will be apparent that they may be otherwise disposed.

I have shown reinforcing pieces 23 welded onto the tubes 2, 9 and around the slots 21, 22 in order to reinforce the tube around the slots since the initial strength of the tube is weakened by the slots.

It will be apparent from the above that when the license plate has been inserted edgewise through the several slots 6 of the three stationary tubes, and after the detachable tube has been placed into position, as shown in Figure 1, the hooks 14 on the spring arms 13 are held in the path of the hooks 18 by the end portions of the license plate so that the tube 9 cannot be disengaged or removed from the stationary frame. Since the license plate is enclosed around its four edges it cannot be removed from the frame except in the manner hereinafter described.

In Figure 8 I have shown an enlargement or increase 25 in the width of the slot 6 of the lower tube 2 and the upper tube 9 is provided with a similar enlargement in line with that of the lower tube.

Assuming that the operator of the automobile is about to remove the license plate and put a new one in the frame, he may proceed as follows: A chisel may be used to cut the plate 20 into two sections by cutting crosswise of the plate in line with the notches 21, 22. The purpose of the notches is to allow the tool which is used to cut the plate to be inserted far enough to reach the extreme edges of the license plate. If desired, a hack saw may be employed to saw the plate in two, but in most cases it is preferably to lay the plate against a supporting surface and with a chisel cut through the same in line with the notches 21, 22. This will divide the plate into two sections 26 and 27.

The section 27 may then be slid lengthwise of the frame toward the right, as shown in Figure 3; and the section 26 may also be slid lengthwise of the frame, to the left in Figure 3. In order to allow the divided sections of the plate to pass each other or overlap, the section 26 may move sidewise in the enlargements 25 of the upper and lower tubes in order that this section of the plate may be switched and moved laterally enough to permit it to overlap the section 27 of the plate, as shown in Figure 8. When the two sections of the plate have been moved to overlapping relation, as shown in Figure 3, the extreme ends of the plate will have been withdrawn from the two vertical tubes 3, 4 and therefore, they will have been withdrawn from behind the spring arms 13. As soon as this occurs, these spring arms, due to their original shape and their resiliency, will swing laterally sufficiently to permit the hooks 14 to pass the hooks 18; or, in other words, the tube 9 will be unlocked and it may be withdrawn by moving it upwardly from the stationary members of the frame, disengaging the projections 12 and the spring arms 13 from the two vertical tubes. When the top tube has been removed, the two portions of the license plate may be lifted vertically out of the frame. A new license plate may then be reinserted into the frame in the same manner as was the original, and the tube 9 may be returned to the position shown in Figure 1, thus locking and securing the new plate in position.

It will be apparent from the above that it is necessary to cut the license plate in two in order to remove it from the frame, and the plate will of course show that it has been mutilated.

As the license plate is ordinarily renewed but once a year, the trouble involved in cutting the plate to remove it from the frame is more than compensated for by the fact that the license plate cannot be surreptitiously removed quickly and in many cases this will prevent a thief from quickly removing the license plate and thus destroying the identity of the vehicle to which it is applied.

I have shown the posts 12 on which the spring arms 13 are mounted provided with vertical slots 30 to receive the upper edge of the license plate, so that the license plate is centrally held in order that it will accurately hold the hooks 14 of the spring arms 13 locked below the hooks 18 when the device is in assembled position. The top of the slot 30 also prevents the license plate from jumping upwardly.

It will be apparent that both front and rear license plates may be mounted in locking frames such as shown and described herein.

Having described my invention, what I claim is:

1. In a frame for holding license or similar plates, a stationary frame member having an opening therein to expose the major portion of the plate and having slots to receive the edges of the plate therein, said frame extending around a substantial portion of the plate, and a removable frame member for engaging an edge of the license plate to hold the same in locked position within said stationary frame member, said removable frame member having locking means for locking the same to said stationary frame member, said locking means being enclosed within the frame when said removable member is in locking position, said locking means being held in locked position by the plate held within said frame, whereby the license plate must be divided into separate parts to disengage the same from said frame locking means.

2. In a frame for holding license or similar plates, a tubular, stationary frame member having an opening therein to expose the major portion of the plate, and having slots facing said opening to receive the edges of the license plate therein, said frame extending around a substantial portion of the license plate, and a tubular, removable frame member for engaging an edge of the license plate to hold the same in locked position within said stationary frame member, said removable member having a slot facing said frame opening, means for locking said removable frame member to said stationary frame member, said locking means being enclosed in said frame when the removable frame member is in operative position, said locking means being held in locked position by the license plate held within said frame, whereby the license plate must be divided into separate parts to disengage the same from said frame locking means.

3. In a frame for holding license or similar plates, a stationary frame member having an opening therein to expose the major portion of the plate and having slots to receive the edges of the plate therein, said frame extending around a substantial portion of the plate, a removable frame member for engaging an edge of the license plate to hold the same in locked position within said stationary frame member, resilient interlocking members for locking said removable frame member to said stationary frame member, one of said interlocking members being disposed within said stationary frame member, and another carried by said removable frame member, said latter locking member being adapted to be held in locking relation with the first mentioned locking member by the license plate held in said frame, whereby the license plate must be divided into parts to unlock said locking means.

4. In a frame for holding license or similar plates, a stationary frame member having an opening therein to expose the major portion of the plate and having slots facing said opening to receive the edges of the plate therein, said stationary frame member extending around a substantial portion of the plate, a removable frame member for engaging an edge of said plate to hold the same in locked position within said stationary frame member, a resilient locking member fixed in said stationary frame member, a resilient locking member carried by said removable frame member and adapted to co-operate with said first locking member to lock the movable to the stationary frame member, said locking members being held in locking relation by a plate held in said frame, whereby said plate must be divided into parts to disengage the same from said locking members to permit the removal of said removable frame members.

5. In a frame for holding license or similar plates, a stationary frame member having an opening to expose the face of the plate and having slots facing said opening to receive the edges of the plate therein, said frame extending around a substantial portion of the plate, a removable frame member for engaging an edge of the license plate to hold the same in locked position within said stationary frame member, a resilient arm secured in said stationary frame member and having a locking member thereon, a resilient arm carried by the removable frame member and having a hook adapted to escape past said locking member of said first arm when the movable frame member is being placed in locking position, said second mentioned arm being adapted to be disposed to engage the face of the plate held in said frame and to be held thereby so that said hook is in the path of said first locking member, whereby the plate must be severed into sections to release said locking means for the removal of said removable frame member.

6. In a frame for holding license or similar plates, a tubular, U shaped stationary frame member having an opening therein to expose the major portion of the plate and having slots facing said opening to receive the edges of the plate therein, a tubular, removable frame member for engaging an edge of the license plate to hold the same in locked position within said stationary frame member, said removable frame member having a slot to receive an edge of the plate therein, said removable frame member having posts on opposite ends thereof adapted to enter the open ends of said stationary frame member, locking members in said stationary frame member, co-operating locking members carried by said posts and adapted to escape past said first locking members when said removable frame member is being attached to the stationary frame member, said locking means being retained in locking engagement by a plate held in said frame whereby the plate must be divided into parts to remove the same from said frame.

7. In a frame for holding license or similar plates, a stationary frame member having an opening therein to expose the major portion of the plate and having slots to receive the edges of the plate therein, said frame extending around a substantial portion of the plate, a removable frame member for engaging an edge of the license plate to hold the same in locked position within said stationary frame member, interlocking members for locking said removable frame member to said stationary frame member, a license plate insertible in said frame with its edges enclosed by said frame members, said plate being adapted to maintain said locking members in locking relation when the stationary frame member is in active position, said plate being adapted to be severed into sections and the sections to be slid into overlapped relation to disengage the separate sections of the plate from said locking means and thereby release said removable frame member.

8. In a frame for holding license or similar plates, a stationary frame member having an opening therein to expose the major portion of the plate and having slots facing said opening to receive the edges of the plate therein, said frame extending around a substantial portion of the plate, and a removable frame member for engaging an edge of the license plate to hold the same in locking position within said stationary frame, said removable member having a slot facing said opening and disposed in the same vertical plane with the slots of said stationary frame member, cooperating locking means enclosed within said frame members for locking the removable to the stationary frame member, a license plate insertible in said frame with its edges enclosed within said frame members, said plate being adapted to hold said locking members in locking relation when said removable frame is in operative position, said plate being adapted to be severed into sections, the slots of said stationary and removable frame members being widened to permit the edges of the severed sections of the plate to be moved into overlapping relation to each other whereby the severed sections of the plate may be disengaged from said locking means.

9. In a frame for holding license or similar plates, a tubular stationary frame member having an opening therein to expose the major portion of the plate, and having slots facing said opening to receive the edges of the plates therein, a tubular, removable frame member having a slot facing said opening to receive at least one edge of the plate therein to hold the plate in locking position within said stationary frame member, locking means enclosed within said frame when in operative condition, to prevent the removal of said removable frame member, said plate adapted to be held in said frame with its edges projecting through said slots into the stationary and removable frame members, said plate being adapted to retain said locking means in locking relation, said stationary and removable frame members having notches extending inwardly from the slotted portions thereof to expose portions of the edges of said plate to permit the plate to be severed into sections.

Signed at New York, county of New York and State of New York, this 22 day of June, 1932.

GEO. M. KESSLER.